United States Patent [19]
Robinson

[11] Patent Number: 4,646,617
[45] Date of Patent: Mar. 3, 1987

[54] SHOCK ABSORBING SUPPORT PAD SYSTEM

[75] Inventor: Mary A. Robinson, Newark, Calif.

[73] Assignee: Westinghouse Electric Corp., Pittsburgh, Pa.

[21] Appl. No.: 771,340

[22] Filed: Aug. 30, 1985

[51] Int. Cl.⁴ .............................................. F41F 3/04
[52] U.S. Cl. .................................. 89/1.810; 89/1.816
[58] Field of Search ................... 89/1.816, 1.810, 1.8, 89/1.809

[56] References Cited

U.S. PATENT DOCUMENTS

| | | | |
|---|---|---|---|
| 3,072,022 | 1/1963 | Wood et al. | 89/1.810 X |
| 3,124,040 | 3/1964 | Fiedler | 89/1.816 |
| 3,289,533 | 12/1966 | Brown | 89/1.810 |
| 3,367,235 | 2/1968 | Andrews | 89/1.816 |
| 3,857,321 | 12/1974 | Cohen | 89/1.816 X |
| 4,406,211 | 9/1983 | Andersen | 89/1.816 |
| 4,426,755 | 1/1984 | Figone | 24/28 |
| 4,433,848 | 2/1984 | Williams | 89/1.816 X |
| 4,464,972 | 8/1984 | Simon | 89/1.816 |
| 4,485,719 | 12/1984 | Mendelsohn et al. | 89/1.816 |

Primary Examiner—David H. Brown
Attorney, Agent, or Firm—F. J. Baehr, Jr.

[57] ABSTRACT

A shock absorbing support pad system for a missile utilizing a pad formed from two spaced apart arcuate sheets and a plurality of chevron-shaped struts extending between the sheets and made integral therewith, an arcuate metal plate having a plurality of closely disposed bell-shaped protrusions with their domes removed adhesively attached to the inner arcuate sheet and a sheet of foam sandwiched between two Kevlar sheets which are stitched together and disposed between the metal plate and the missile to distribute the load over small irregularities on the missile surface and insure separation of the pad from the missile after launch.

8 Claims, 3 Drawing Figures

SHOCK ABSORBING SUPPORT PAD SYSTEM

GOVERNMENT CONTRACT

The U.S. Government has rights in this invention in accordance with Contract No. F04704-82-C-0017 between Westinghouse Electric Corporation and the Department of Defense.

BACKGROUND OF THE INVENTION

This invention relates to shock absorbing support pads for missiles and more particularly to such a pad which is initially attached to the missile and is released therefrom after launch.

The shock absorbing support pad must interface with the missile in such a manner to maintain adequate shear strength, not adhere to the environmental protection material on the surface of the missile and provide compliance and load distribution over bumps or small irregularities on the surface of the missile.

SUMMARY OF THE INVENTION

In general, a shock absorbing support pad system for a missile, when made in accordance with this invention, comprises a first arcuate sheet, a second arcuate sheet spaced from said first arcuate sheet and a plurality of pre-buckled struts made integral with and extending between said sheets. A metal plate having a plurality of pierced protrusions extending from one side thereof is adhesively attached to one of said arcuate sheets so that the protrusions extend away from the pad. A sheet of foam is sandwiched between two sheets of woven material and all are fastened together into a unitized sheet which is disposed between the metal plate and the missile when the pad is detachably placed on the missile.

BRIEF DESCRIPTION OF THE DRAWINGS

The objects and advantages of this invention will become more apparent by reading the following detailed description in conjunction with the accompanying drawings, in which.

DESCRIPTION OF A PREFERRED EMBODIMENT

Figure 1:
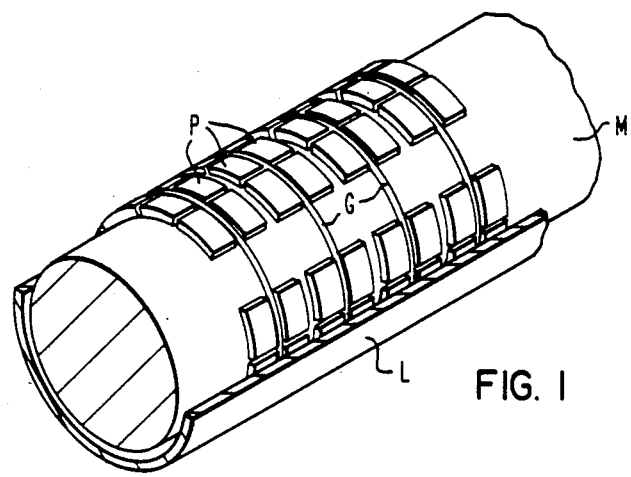
FIG. 1 is a perspective view partially in section of a portion of a missile disposed in a launch tube with shock absorbing support pads disposed on the missile.

Referring now to the drawings in detail and in particular to FIG. 1, there is shown a portion of a missile M disposed in a launch tube L. The missile M has a plurality of shock absorbing support pads P held thereon by a girth band G.

Figure 2:
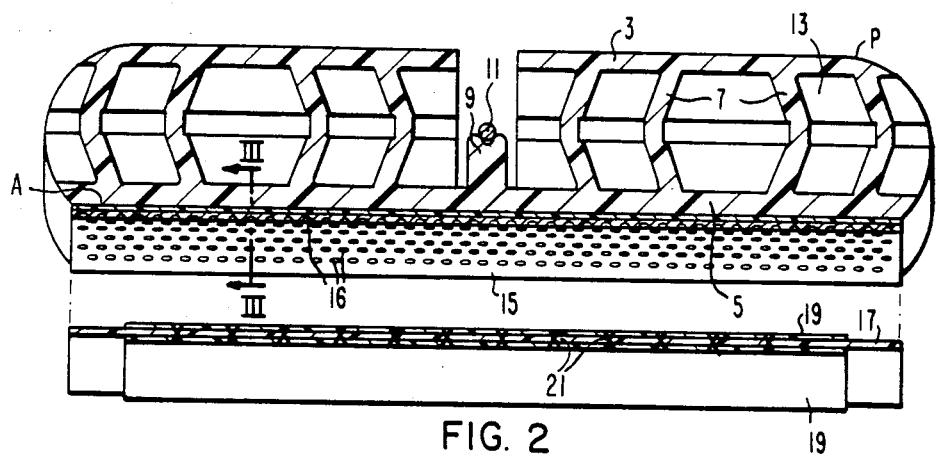
FIG. 2 is a sectional view of a shock absorbing support pad system made in accordance with this invention.
Figure 3:
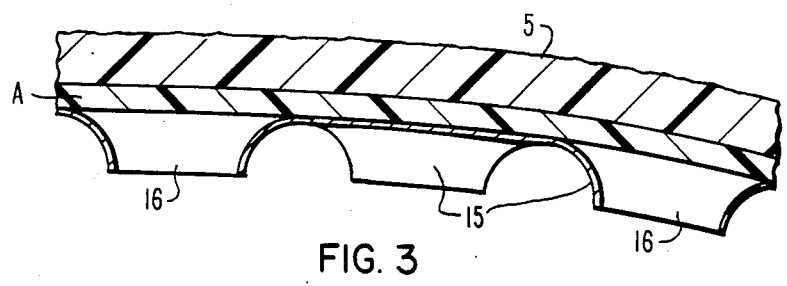
FIG. 3 is an enlarged sectional view taken on line III—III of FIG. 2.

FIGS. 2 and 3 show a shock absorbing support pad system for the missile M. The system comprises the pad P having a first or outer arcuate sheet 3, a second or inner arcuate sheet 5 spaced radially inwardly from the outer arcuate sheet 3 and a plurality of pre-buckled chevron-shaped struts 7 extending between the sheets 3 and 5 and made integral therewith. The radially outer arcuate sheet 3 is made in two parts and there is a cable support 9 disposed between the sheets 3 and 5 in the center of the pad P between the two portions of the outer arcuate sheet 3 and made integral with the inner sheet 5. The cable support 9 has a groove 11 for receiving a girth band G which releasably holds the pad P to the missile M as described in detail in U.S. Pat. No. 4,426,755 entitled "Quick Release Girth Band" which is hereby incorporated by reference.

The struts 7 are spaced apart axially with respect to the missile M and struts 13 are disposed radially with respect to the missile adjacent both radial margins of the pad P. The axially spaced struts 7 are disposed in two groups between each part of the outer arcuate sheet 3, each group comprising a plurality of chevron-shaped struts 7 which have their apexes facing away from the center of each of the outer arcuate portions of the sheet 3. The struts 13 have their apexes facing outwardly with respect to the pad P.

An arcuate metal plate 15 is attached to the inner surface of the inner sheet 5 by an adhesive A, the plate 15 has a plurality of closely disposed bell-shaped protrusions 16 which have the dome portion of the bell removed or pierced. The protrusions 16 extend away from the pad P.

A sheet of urethane foam 17 is sandwiched between two sheets of Kevlar ® woven material 19, stitches 21 fasten the three sheets together forming a unitized separation sheet, which is disposed between the metal plate 15 and the missile M when the pads P are disposed on the missile M. The shock absorbing support system hereinbefore described provides the shear strength at the interface of the pad and missile which does not allow the pad to stick to the environmental protection coating on the missile, prevents the pads from rocking over bumps in the missile surface and distributes the shock load so as not to overload any bumps or irregularities in the missile surface.

I claim:

1. A shock absorbing support pad system for a missile comprising:
   a first arcuate sheet;
   a second arcuate sheet spaced from said first arcuate sheet;
   a plurality of pre-buckled struts made integral with and extending between said first and second sheets;
   a metal plate having a plurality of pierced protrusions extending from one side thereof;
   said metal plate being adhesively fastened to one of said arcuate sheets so that the protrusions extend away from said one arcuate sheet;
   a sheet of foam sandwiched between two sheets of woven material fastened together to form a unitized sheet which is disposed between said metal plate and said missile when said support pad system is detachably placed on said missile.

2. A shock absorbing support pad system as set forth in claim 1, wherein the protrusions are generally bell-shaped with the dome of the bell removed.

3. A shock absorbing support pad system as set forth in claim 1, wherein the first arcuate sheet is made up of two portions and a cable support is disposed on the second arcuate sheet between the two portions of the first arcuate sheet.

4. A shock absorbing support pad system as set forth in claim 1, wherein the pre-buckled struts are chevron-shaped.

5. A shock absorbing support pad system as set forth in claim 4, wherein the chevron-shaped struts are axially disposed and radially disposed with respect to the missile.

6. A shock absorbing support pad system as set forth in claim 1, wherein the woven sheet material is Kevlar.

7. A shock absorbing support pad system as set forth in claim 6, wherein the fastening between the two woven sheets of Kevlar is stitching.

8. A shock absorbing support pad system as set forth in claim 2, wherein the foam material is urethane.

* * * * *